United States Patent
Zhang et al.

(10) Patent No.: US 10,474,297 B2
(45) Date of Patent: Nov. 12, 2019

(54) PROJECTING A STRUCTURED LIGHT PATTERN ONTO A SURFACE AND DETECTING AND RESPONDING TO INTERACTIONS WITH THE SAME

(71) Applicant: ams Sensors Singapore Pte. Ltd., Singapore (SG)

(72) Inventors: Chi Zhang, Fremont, CA (US); Florin Cutu, San Jose, CA (US)

(73) Assignee: AMS SENSORS SINGAPORE PTE. LTD., Singapore (SG)

( * ) Notice: Subject to any disclaimer, the term of this patent is extended or adjusted under 35 U.S.C. 154(b) by 21 days.

(21) Appl. No.: 15/654,904

(22) Filed: Jul. 20, 2017

(65) Prior Publication Data
US 2018/0024697 A1  Jan. 25, 2018

Related U.S. Application Data

(60) Provisional application No. 62/364,446, filed on Jul. 20, 2016.

(51) Int. Cl.
| | |
|---|---|
| *G06F 3/048* | (2013.01) |
| *G06F 3/042* | (2006.01) |
| *G06F 3/01* | (2006.01) |
| *G06F 3/0488* | (2013.01) |
| *G06K 9/00* | (2006.01) |

(52) U.S. Cl.
CPC ............ *G06F 3/0426* (2013.01); *G06F 3/017* (2013.01); *G06F 3/04883* (2013.01); *G06F 3/04886* (2013.01); *G06K 9/00355* (2013.01); *G06K 9/00335* (2013.01)

(58) Field of Classification Search
CPC .... G06F 3/0426; G06F 3/017; G06F 3/04886; G06K 9/00335
See application file for complete search history.

(56) References Cited

U.S. PATENT DOCUMENTS

| | | | |
|---|---|---|---|
| 7,440,590 B1 * | 10/2008 | Hassebrook | G01B 11/2513 345/582 |
| 8,320,621 B2 | 11/2012 | McEldowney | |
| 8,749,796 B2 | 6/2014 | Pesach et al. | |
| 8,881,051 B2 * | 11/2014 | Frey | G06F 3/013 715/800 |
| 8,887,043 B1 * | 11/2014 | Pollack | G06F 3/0304 345/108 |
| 8,908,277 B2 | 12/2014 | Pesach et al. | |
| 9,063,283 B2 | 6/2015 | Shpunt et al. | |
| 9,739,609 B1 * | 8/2017 | Lewis | G01S 17/89 |

(Continued)

FOREIGN PATENT DOCUMENTS

WO   WO 2015/130226   9/2015

*Primary Examiner* — David Phantana-angkool
(74) *Attorney, Agent, or Firm* — Michael Best & Friedrich LLP

(57) ABSTRACT

The present disclosure describes projecting a structured light pattern projected onto a surface and detecting and responding to interactions with the same. The techniques described here can, in some cases, facilitate recognizing that an object such as a user's hand is adjacent the plane of a projection surface and can distinguish the object from the projection surface itself. Movement of the object then can be interpreted, for example, as a specified type of gesture that can trigger a specified type of operation to occur.

20 Claims, 4 Drawing Sheets

(56) References Cited

U.S. PATENT DOCUMENTS

| | | | |
|---|---|---|---|
| 9,870,056 B1* | 1/2018 | Yao | G06F 3/011 |
| 9,990,029 B2* | 6/2018 | Kochi | G06F 3/011 |
| 9,996,638 B1* | 6/2018 | Holz | G06F 3/017 |
| 2009/0316116 A1* | 12/2009 | Melville | A61B 1/0008 |
| | | | 353/31 |
| 2010/0199232 A1* | 8/2010 | Mistry | G06F 1/163 |
| | | | 715/863 |
| 2011/0037953 A1 | 2/2011 | Nizani et al. | |
| 2014/0376092 A1 | 12/2014 | Mor | |
| 2015/0293590 A1* | 10/2015 | Lehtiniemi | G06F 3/016 |
| | | | 715/702 |
| 2016/0006914 A1* | 1/2016 | Neumann | G06F 3/0325 |
| | | | 348/78 |
| 2016/0063724 A1* | 3/2016 | Tunstall | G06T 7/0014 |
| | | | 382/128 |
| 2016/0291200 A1 | 10/2016 | Bakin et al. | |
| 2017/0090020 A1 | 3/2017 | Buettgen | |
| 2017/0135617 A1 | 5/2017 | Alasirniö et al. | |
| 2019/0121522 A1* | 4/2019 | Davis | G06F 3/04815 |

\* cited by examiner

PROJECTING A STRUCTURED LIGHT PATTERN ONTO A SURFACE AND DETECTING AND RESPONDING TO INTERACTIONS WITH THE SAME

FIELD OF THE DISCLOSURE

The present disclosure relates to projecting a structured light pattern onto a surface and detecting and responding to interactions with the same.

BACKGROUND

Gesture recognition enables humans to communicate with a machine and interact, in some cases, without a mechanical device. Depending on the application, gestures can originate from any bodily motion or state, but commonly originate from movement of the hands or fingers. In gesture recognition technology, a camera reads the movements of the human body and communicates the data to a computing device that uses the gestures as input to control devices or applications.

SUMMARY

The present disclosure describes projecting a structured light pattern onto a surface and detecting and responding to interactions with the same.

For example, in one aspect, a method includes projecting a structured light pattern onto a projection surface, wherein the structured light pattern is composed of light of a particular wavelength. The method includes acquiring an image based on light of the particular wavelength reflected from a vicinity of the projection surface, identifying regions of the acquired image for which there is a change in intensity data relative to corresponding regions of a reference image and for which disparity data indicates the regions of the acquired image correspond to a feature that is within a specified distance of the projection surface, and determining that the feature is a particular type of object. The method further includes repeating these latter steps one or more times, and performing frame-to-frame tracking to determine a path of movement of the object. The method also includes determining that the object's path of movement represents a specified type of gesture.

Some implementations include one or more of the following features. For example, image morphology filtering and/or shape descriptor filtering can be performed with respect to the identified regions of the acquired image. In some cases, the acquired image can be compared to the reference image to identify regions of the acquired image for which the change in intensity is equal to or greater than a predetermined threshold value. A disparity map can be generated for the acquired image by assigning one of two possible disparity values to pixels in the acquired image, and the method can include identifying regions of the acquired image for which the disparity value is a particular one of the two possible disparity values.

In some instances, the particular wavelength is in the infra-red or near infra-red portions of the spectrum. In some implementations, the method includes projecting a visible pattern onto the projection surface at the same time as the structured light pattern is projected onto the projection surface.

In response to determining that the object's path of movement represents a specified type of gesture, the method can include causing another apparatus to perform a specified operation based on the type of gesture.

The disclosure also describes an apparatus to implement the foregoing methods. For example, the apparatus can include a first projector operable to project a structured light pattern onto a projection surface, wherein the structured light pattern is composed of light of a particular wavelength. The apparatus also includes an image sensor operable to acquire images based on light of the particular wavelength reflected from a vicinity of the projection surface. One or more processors are operable collectively to identify regions of an acquired image for which there is a change in intensity data relative to corresponding regions of a reference image and for which disparity data indicates the regions of the acquired image correspond to a feature that is within a specified distance of the projection surface, and to determine that the feature is a particular type of object. The foregoing can be repeated one or more times for at least one other acquired image. The processor(s) also are operable to perform frame-to-frame tracking to determine a path of movement of the object, and to determine that the object's path of movement represents a specified type of gesture.

In some implementations, the apparatus includes a second light projector operable to project a visible pattern onto the projection surface at the same time as the structured light pattern is projected onto the projection surface.

Various advantages are present in some implementations. For example, the techniques described here can, in some cases, facilitate recognizing that an object (e.g., a user's hand) is adjacent the plane of the projection surface and can distinguish the object from the projection surface itself. Movement of the object (e.g., the user's hand) then can be interpreted, for example, as a specified type of gesture that can trigger a specified type of operation to occur. Example applications include the following: causing a display monitor to display an alphanumeric character, causing a light to be turned on, off or dimmed, or causing a computing device to transition to a next slide of a presentation.

Other aspects, features and advantages will be readily apparent from the following detailed description, the accompanying drawings, and the claims.

DETAILED DESCRIPTION

The present disclosure describes an apparatus, including an optoelectronic module, operable to project a structured light pattern onto a surface (e.g., a wall) and to detect and respond to a user's interactions with the projected light pattern (e.g., via hand or other gestures). In particular, the apparatus is operable to determine whether an object is in proximity to the surface onto which the light pattern is projected and to determine whether the object is of a predetermined type (e.g., a human hand). If it is determined that the object is in proximity to the surface and is of a particular type, gesture recognition techniques can be used to recognize a position or movement of the user's hand, or other object. The detected position or movement of the object then can be used as input that triggers a predetermined response in the module or an associated apparatus.

In some instances, an infra-red (IR) or other structured light pattern not visible to the human eye is projected onto the surface along with a visible light pattern. The visible pattern can be used, for example, to help direct the user to particular areas of the non-visible IR pattern, whose reflections from the surface or other object can be detected by the module. An example application includes projecting a structured IR light pattern onto a wall, and also projecting onto the wall a virtual keyboard using visible light. The apparatus can recognize and respond to the selection of keys on the virtual keyboard by a user using, for example, hand or finger gestures. In other instances, patterns may be projected onto a floor to allow users to play a virtual video or other game by interacting with a non-visible structured light pattern projected onto the floor. Here too, a visible pattern can be projected onto the floor to direct the users to particular areas of the floor where their interactions with the structured light pattern can be sensed by the module.

In some cases, only a non-visible pattern is projected onto the surface. For example, a specified IR pattern can be projected onto a wall of a home or office. By sliding her hand over the wall where the pattern is projected, the user can cause a specified response to occur (e.g., causing a light in the room to be turned on, off or dimmed). The apparatus described here can be used in other applications as well.

Figure 1:
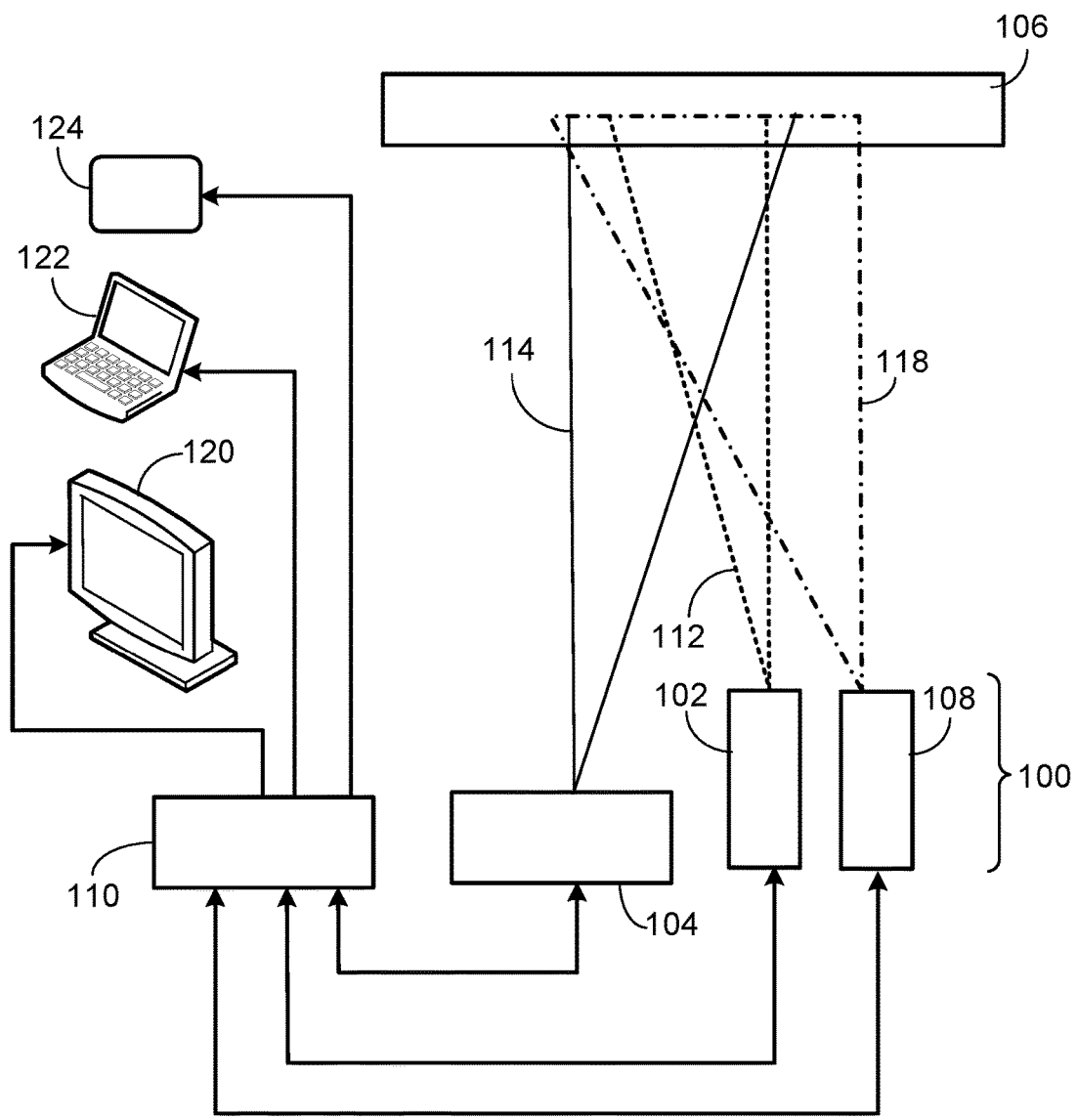
FIG. 1 illustrates an apparatus for generating a structured light pattern projected on a surface and detecting and responding to interactions with the same.

As shown in FIG. 1, a module 100 includes a first light projector 102 operable to project a structured light pattern 112. In some implementations, the projected pattern 112 consists of light in the IR or near-IR region of the spectrum. The light emitted by the structured light projector 102 can form, for example, a pattern 112 of discrete features (i.e., structured or encoded light) being projected onto a substantially flat surface 106 external to the module 100. The structured light, or a portion thereof, can be reflected, for example, by the surface 106. The reflected light can be sensed by an image sensor 104 that includes spatially distributed light sensitive components (e.g., pixels) that are sensitive to a wavelength of light emitted by the structured light projector 102. The image sensor 104 has a field of view (FOV) 114 arranged to capture at least some light that is emitted by the first light projector 102 and that subsequently is reflected by the surface 106. The detected signals can be read-out and used, for example, by processing circuitry 110. Using structured light can be advantageous, for example, in determining distance or disparity values.

In some instances, the structured light projector 102 can include, for example, a high-power light emitting element such as a laser diode, a VCSEL or an array of VCSELs operable to emit a predetermined range of wavelengths, e.g., in the IR or near-IR part of the spectrum. The structured light projector 102, in some cases, is operable to emit light in the range of about 850 nm±10 nm, or in the range of about 830 nm±10 nm, or in the range of about 940 nm±10 nm. Other wavelengths or ranges may be appropriate for some implementations.

The image sensor 104 can be implemented, for example, on a single integrated semiconductor chip as a CCD (charge-coupled device) sensor or CMOS (complementary metal-oxide-semiconductor) sensor.

In some implementations, the module 100 also includes a second light projector 108 operable to project a light pattern 118 in the visible part of the spectrum (e.g., RGB and/or other visible light). If the surface 106 falls within a given range of distances from the module 100, the patterns 112, 118 projected by the first and second light projectors 102, 108 onto the surface 106 will overlap, such that the visible pattern 118 appearing on the surface 106 can be used to indicate to a user the area of the surface 106 on which the non-visible structured light pattern 112 is projected.

The light projectors 102, 108 and the image sensor 104 can be mounted, for example, on the same substrate such as a printed circuit board (PCB). The processing circuitry 110 can be part of the module 100 itself or can be external to the module. In some cases, the processing circuitry 110 can be implemented, for example, as one or more integrated circuit chips, and can include a microprocessor programmed to process signals read out from the image sensor 104 in accordance with the techniques described in greater detail below. In some instances, the processing circuitry 110 is implemented as a laptop, desktop or other computing device that is coupled to the image sensor 110. The processing circuitry 110 also can be coupled to the light projectors 102, 108 to control, for example, when the light patterns are projected from the module 100. More generally, the processing circuitry 110 can be implemented as one or more processors programmed to implement the process(es) described here.

As explained in greater detail below, the processing circuitry 110 can be configured through hardware and/or software to process the signals from the image sensor to determine whether an object such as a user's hand or finger is in proximity to the surface 106 onto which the light patterns are projected and to determine whether the object is recognizable as a predetermined type (e.g., a human hand). For example, disparity data and changes in intensity data can be used, together with image morphology filtering and shape descriptor filtering, to identify regions of an acquired image that may correspond to a user's hand or other object of interest interacting with the projected pattern of structured light 112. Frame-to-frame tracking of the object of interest can be performed to detect, for example, the trajectory of the object in the field of view 114. The shape descriptor data and trajectory data then can be compared to previously generated reference data to facilitate characterization of the object's movement (e.g., as a hand gesture) and, in response, to effect a specified action (e.g., turning a light on or off in response to the user swiping her hand in front of a wall; storing and/or displaying an alphanumeric character selected by a user by pointing to a key on a virtual keyboard projected onto a wall; causing an electronic presentation displayed on a screen to transition to a subsequent slide in response to a user swiping his hand in front of the screen).

Figure 2A:
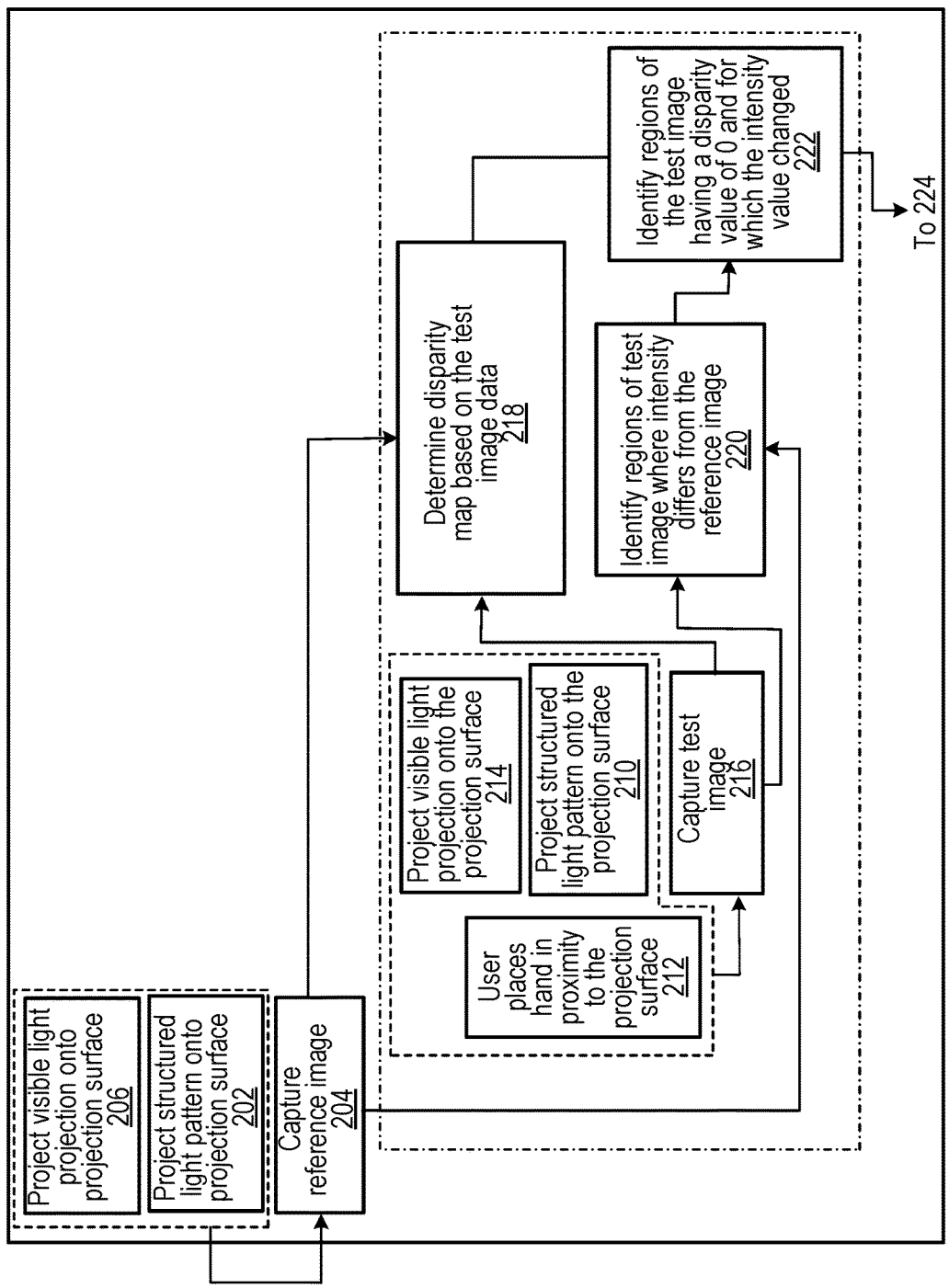
FIGS. 2A and 2B are a flow chart of a method for projecting a structured light pattern onto a surface and detecting and responding to interactions with the same.
Figure 2B:
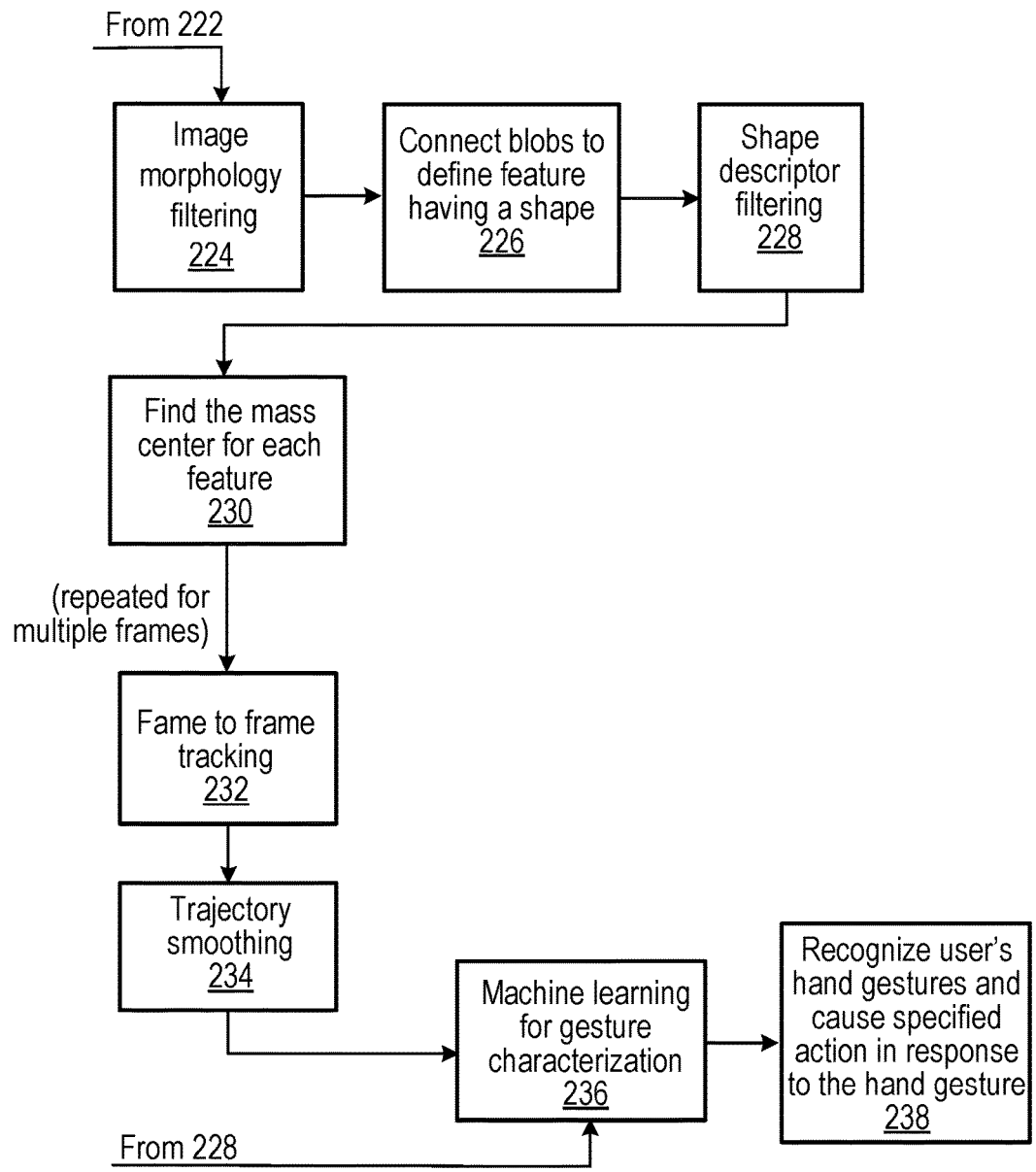

FIGS. 2A and 2B indicate further details of these and other aspects of a method for acquiring image data using the module 100 and for processing the sensed image data. In the following example, reference is made to a user's hand, but in some instances, could be a user's other body part (e.g., finger) or some other object held by the user (e.g., a pointer).

The method includes using the structured light projector 102 to project a structured light pattern 114 onto the projection surface 106 (202). Reference image data is acquired using the image sensor 104 based on light reflected from the projection surface 106 (204). In some implementations, the light projector 108 projects a visible light pattern 118 onto the projection surface 106 (206) while the structured light pattern 114 is projected onto the surface 106. In other cases, this step may be omitted.

At some later time, while the structured light projector 102 projects a structured light pattern 114 onto the projection surface 106 (210), a user places her hand in contact with or, or in close proximity to, the projection surface 106 (212).

In some implementations, the light projector 108 is used to project a visible light pattern 118 onto the projection surface 106 to guide the user to the area(s) of the projection surface 106 where she can interact with the non-visible structured light pattern (214). Test image data then is acquired using the image sensor 104 based on light reflected from the projection surface 106 and from the user's hand (216).

Disparity information then is computed at 218 from a pair of images (e.g., the reference image and the test image) by computing the distance in pixels between the location of a feature in one image (e.g., the reference image captured in 204) and the location of the same or substantially same feature in the other image (e.g., the test image captured in 216). Thus, the second image is searched to identify the closest match for a small region (i.e., block of pixels) in the first image. Various techniques can be used to determine how similar regions in the two images are, and to identify the closest match. One such known technique is the "sum of absolute differences," sometime referred to as "SAD." To compute the sum of absolute differences between a template and a block, a grey-scale value for each pixel in the template is subtracted from the grey-scale value of the corresponding pixel in the block, and the absolute value of the differences is calculated. Then, all the differences are summed to provide a single value that roughly measures the similarity between the two image regions. A lower value indicates the patches are more similar. To find the block that is "most similar" to the template, the SAD values between the template and each block in the search region is computed, and the block with the lowest SAD value is selected. The disparity refers to the distance between the centers of the matching regions in the two images. In a disparity map, pixels with larger disparities are closer to the camera, and pixels with smaller disparities are farther from the camera.

Some SAD algorithms distinguish between sixteen or more disparity values. In the present context, however, the SAD algorithm can be modified such that only two disparity values are assigned (i.e., 0 or 1). This modification is possible because the process need only determine if an object in the image is less than a specified distance from the projection surface 106 (in which case a disparity value of 0 can be assigned) or if the object is at a significantly different distance from the projection surface (in which case a disparity value of 1 can be assigned). A disparity value of 1 indicates that the object is of no interest (e.g., for possible gesture recognition), whereas a disparity value of 0 indicates that the object may be of interest. An advantage of using a modified SAD algorithm using only two possible disparity values is that it can increase computation time and can reduce consumption of computing resources.

In addition to generating the disparity map in 218, the process identifies regions of the test image for which the detected intensity differs from the intensity of a corresponding region in the reference image (220). This can be accomplished, for example, by comparing the absolute difference of the intensity values for corresponding parts of the reference and test images. The process assumes that changes in intensity are indicative of an object (e.g., a user's hand) interacting with the structured light pattern. Then, based on the disparity map obtained in 218 and the results of the comparison in 220, the process identifies regions of the test image data having a disparity value of 0 and for which the intensity value changed (222). In some cases, the process determines whether the difference (if any) in the intensity values exceeds some predetermined threshold rather than simply determining whether the intensity value changed. The process thus generates a binary image in which regions of the image that are determined to correspond to the object (e.g., the user's hand) are assigned a value of 1, and regions of the image that are determined not to correspond to the object (e.g., the user's hand) are assigned a value of 0.

Next, in 224, the process applies image morphology filtering to the binary image obtained in 222 using, for example, image dilation and erosion. Morphology refers to image processing operations that process images based on shapes. Dilation adds pixels to the boundaries of objects in an image, whereas erosion removes pixels on object boundaries. The number of pixels added or removed from the objects in an image depends on the size and shape of the structuring element used to process the image. In the morphological dilation and erosion operations, the state of any given pixel in the output image can be determined by applying a rule to the corresponding pixel and its neighbors in the input image. The rule used to process the pixels defines the operation as a dilation or an erosion. Erosion can be used, for example, to remove particles from the structured light pattern that result from random image noise or background noise. Erosion thereby shrinks such particles. In contrast, dilation can be used to increase the size of the remaining particles into clusters, and clusters of adjacent particles can be absorbed into a single contiguous region (i.e., a blob). The morphology filtering thus can facilitate reduction or elimination of the background noise.

As indicated in 226, the regions (i.e., blobs) formed in 224 can be connected to one another. The connection process can be accomplished, for example, for binary blobs in a binary image by tabulating all of the blobs and saving each blob as a tree (i.e., a list of pixels each of which has a value of 1 or 0). The blobs then can be connected or merged together, for example, in the following manner. The centers of the binary blobs within the binary image are computed and blobs located closer than a predetermined minimum distance are merged. As a result of the process 226, adjacent regions are connected or merged such that the connected or merged regions define a feature having a particular shape.

Next, as indicted by 228, the process performs shape descriptor filtering with respect to each feature generated in 226. For example, the list of pixels for each feature generated in 226 can be used to calculate the feature's shape properties (e.g., component area, center of mass, long axis, short axis, circularity, sodality). By predefining thresholds for each of these properties, features having unwanted shapes can be filtered out. For example, in some implementations, only the data for features shaped like a human hand would be retained. This part of the process can help eliminate false detections.

Next, as indicated in 230, the process determines a specified point, such as the mass center, for each feature identified in 228. For example, assuming that the process had identified a feature having the shape of a hand in 228, the process determines the hand's mass center. This step can be accomplished, for example, by using the seven Hu moments, which can be calculated from central moments that are invariant to size, position and orientation. See, e.g., Ming-Kuei Hu, "Visual Pattern Recognition by Moment Invariants," IRE Transactions on Information Theory, 179-187 (1962). The output generated by 230 is mass center data for each feature identified in 228 (i.e., the coordinates of mass center in the IR image). Other algorithms for determining the feature's mass center can be used as well.

The foregoing process (e.g., 210 through 230) can be repeated so as to obtain image data for multiple frames. Then the process can track the feature (e.g., the user's hand) from one frame to the next (232). Examples of suitable tracking techniques include the following: optics flow, template matching, the Mean Shift algorithm, the Continuously Adaptive Mean Shift (Camshift) algorithm, and the Kanade-Lucas-Tomasi (KLT) feature-tracking algorithm. The Mean Shift algorithm, for example, is a robust, non-parametric technique that climbs the gradient of a probability distribution to find the mode (peak) of the distribution; the CamShift algorithm is an adaptation of the Mean Shift algorithm for object tracking. The KLT algorithm accomplishes tracking by finding the parameters that minimize a dissimilarity measurement between feature windows that are related by a pure translation motion model. Other tracking algorithms can be used as well.

The process then can performs trajectory smoothing (234). The raw tracking trajectory sometimes is very noisy; thus a smoothing algorithm can be implemented to eliminate or reduce the noise. A suitable smoothing algorithm is Kalman filtering, also known as linear quadratic estimation (LQE), which uses a series of measurements observed over time, containing statistical noise and other inaccuracies, and produces estimates of unknown variables that tend to be more precise than those based on a single measurement alone, by using Bayesian inference and estimating a joint probability distribution over the variables for each timeframe. Other smoothing algorithms can be used as well. The trajectory smoothing generates smoothed trajectory data. In some instances, the trajectory smoothing can be omitted.

The shape descriptor data obtained in 228 and the trajectory data obtained in 232 (or 234) then can be used, for example, as inputs to a machine learning algorithm that characterizes the hand gestures (236). The machine learning algorithm can be configured, for example, to recognize and categorize one or more trajectories of a particular feature (e.g., a user's hand gesture) in the IR image in accordance with corresponding labels (e.g., "select," "confirm," "swipe," "zoom" or "rotate"), each of which can be indicative of a specified user instruction for a further action to be initiated. Once the system is trained or otherwise configured to recognize particular hand gestures, the process can be used, as indicated in 238, in any of a wide range of applications to trigger specified actions in response to the user's hand gestures (e.g., causing a light to be turned on, off or dimmed in response to the user swiping her hand in front of a wall; storing and/or displaying an alphanumeric character selected by a user by pointing to a key on a virtual keyboard projected onto a wall; causing an electronic presentation displayed on a screen to transition to a subsequent slide in response to a user swiping his hand in front of the screen).

Figure 3:
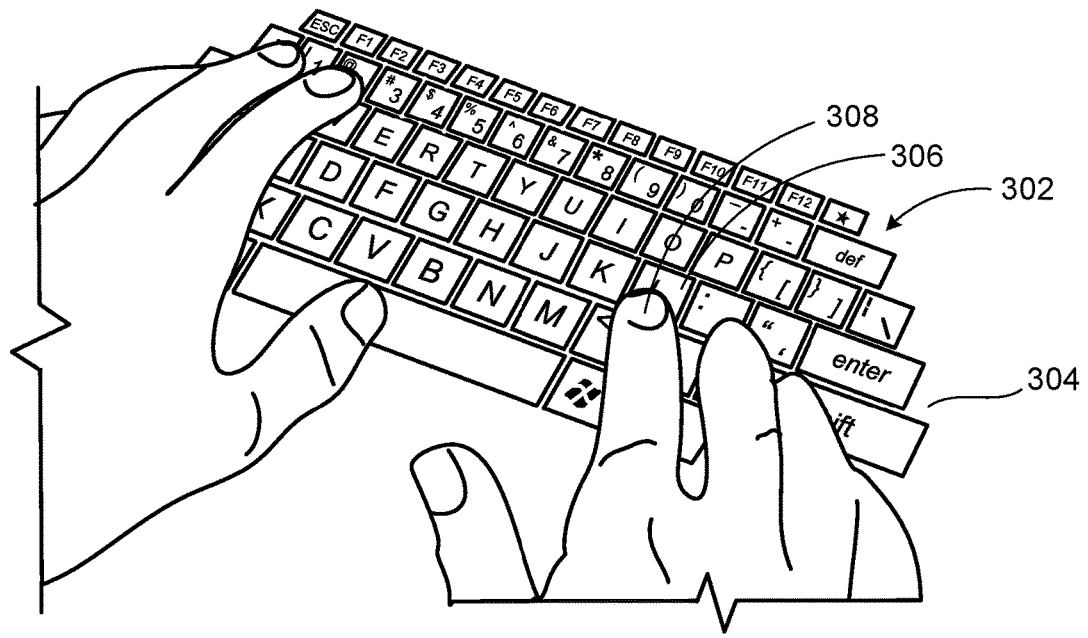
FIG. 3 illustrates an example of an application of the present techniques.

FIG. 3 illustrates an example application of the process of FIGS. 2A and 2B using the module 100 of FIG. 1. In this example, the visible light projector 108 projects a virtual keyboard 302 onto a projection surface 304, which in this example, can take the form of the top surface of a desk or table. The projected image of the virtual keyboard is visible to the user. At the same time, the structured light projector 102 projects, for example, a structured IR pattern onto the surface 304. The IR pattern, however, is not visible to the user. The user can select an alphanumeric or other key 306 on the virtual keyboard 302 by using a finger 308 to tap on the projection surface 304 where the desired alphanumeric key 302 appears. The light reflected by the surface 304 and by the user's finger is sensed by the image sensor 104 and the sensed signals can be processed by the processing circuitry 110 as described above. In this example, the process would recognize that the user had selected a particular key 306 on the virtual keyboard 302. In response, the processing circuitry 110 would take some predetermined action. For example, in some implementations, if the selected key 306 corresponds to a letter or number, the processing circuitry 110 would cause the letter or number to be displayed on a display monitor 120 coupled to the processing circuitry (see FIG. 1).

As noted above, depending on the application, the processing circuitry 110 can be coupled to other devices or apparatus (e.g., a laptop or other computing device operable to project a presentation onto a wall 122; an overhead or other light 124) that can be controlled to effect a predetermined action based on one or more signals from the processing circuitry 110 in response to detection by the processing circuitry 110 of a particular gesture by the user. In some cases, the other device or apparatus may be coupled wirelessly to the processing circuitry 110.

Various modification can be made within the spirit of this disclosure. Accordingly, other implementations are within the scope of the claims.

What is claimed is:

1. A method comprising:
   (a) projecting a structured light pattern onto a projection surface, the structured light pattern being composed of light of a particular wavelength;
   (b) acquiring an image based on light of the particular wavelength reflected from a vicinity of the projection surface;
   (c) identifying, by one or more processors, regions of the acquired image
      for which there is a change in intensity data, relative to corresponding regions of a reference image, the change exceeding a predetermined threshold, and
      for which disparity data indicates the regions of the acquired image correspond to a feature that is within a specified distance of the projection surface;
   (d) determining, by the one or more processors based selectively on the identified regions of the acquired image, that the feature is a particular type of object;
   (e) repeating (b), (c) and (d) one or more times;
   (f) performing frame-to-frame tracking to determine a path of movement of the object; and
   (g) determining, by the one or more processors, that the object's path of movement represents a specified type of gesture.

2. The method of claim 1 including performing image morphology filtering with respect to the identified regions of the acquired image.

3. The method of claim 1 including performing shape descriptor filtering with respect to the identified regions of the acquired image.

4. The method of claim 1 wherein, in (c), the acquired image is compared to the reference image to identify regions of the acquired image for which the change in intensity is equal to or greater than a predetermined threshold value.

5. The method of claim 1 including generating a disparity map for the acquired image by assigning one of two possible disparity values to pixels in the acquired image.

6. The method of claim 5 wherein (c) includes identifying regions of the acquired image for which the disparity value is a particular one of the two possible disparity values.

7. The method of claim 1 wherein the particular wavelength is in the infra-red or near infra-red portions of the spectrum.

8. The method of claim 1 further including projecting a visible pattern onto the projection surface at the same time as the structured light pattern is projected onto the projection surface.

9. The method of claim 1 further including:
in response to determining that the object's path of movement represents a specified type of gesture, causing another apparatus to perform a specified operation based on the type of gesture.

10. The method of claim 9 wherein causing another apparatus to perform a specified operation based on the type of gesture includes at least one of the following:
causing a display monitor to display an alphanumeric character;
causing a light to be turned on, off or dimmed;
causing a computing device to transition to a next slide of a presentation.

11. An apparatus comprising:
a first projector operable to project a structured light pattern onto a projection surface, the structured light pattern being composed of light of a particular wavelength;
an image sensor operable to acquire images based on light of the particular wavelength reflected from a vicinity of the projection surface; and
one or more processors operable collectively to:
(a) identify regions of an acquired image
for which there is a change in intensity data relative to corresponding regions of a reference image, the change exceeding a predetermined threshold, and
for which disparity data indicates the regions of the acquired image correspond to a feature that is within a specified distance of the projection surface;
(b) determine, based selectively on the identified regions of the acquired image, that the feature is a particular type of object;
(c) repeat (a) and (b) one or more times for at least one other acquired image;
(d) perform frame-to-frame tracking to determine a path of movement of the object; and
(e) determine that the object's path of movement represents a specified type of gesture.

12. The apparatus of claim 11 wherein the one or more processors are operable to perform image morphology filtering with respect to the identified regions of the acquired image.

13. The apparatus of claim 11 wherein the one or more processors are operable to perform shape descriptor filtering with respect to the identified regions of the acquired image.

14. The apparatus of claim 11 wherein the one or more processors are operable, in (a), to compare the acquired image to the reference image to identify regions of the acquired image for which the change in intensity is equal to or greater than a predetermined threshold value.

15. The apparatus of claim 11 wherein the one or more processors are operable to generate a disparity map for the acquired image by assigning one of two possible disparity values to pixels in the acquired image.

16. The apparatus of claim 15 wherein the one or more processors are operable to identify regions of the acquired image for which the disparity value is a particular one of the two possible disparity values.

17. The apparatus of claim 11 wherein the particular wavelength is in the infra-red or near infra-red portions of the spectrum.

18. The apparatus of claim 11 further including a second light projector operable to project a visible pattern onto the projection surface at the same time as the structured light pattern is projected onto the projection surface.

19. The apparatus of claim 11 further including a device, wherein the one or more processors are operable, in response to determining that the object's path of movement represents a specified type of gesture, to cause the device to perform a specified operation based on the type of gesture.

20. The apparatus of claim 11 wherein the one or more processors are operable, in response to determining that the object's path of movement represents a specified type of gesture, to perform at least one of the following:
cause a display monitor to display an alphanumeric character;
cause a light to be turned on, off or dimmed;
cause a computing device to transition to a next slide of a presentation.

* * * * *